(12) United States Patent
Amira et al.

(10) Patent No.: US 8,402,492 B2
(45) Date of Patent: Mar. 19, 2013

(54) SYSTEM FOR DISPLAYING VIA A NETWORK OF AN INTERACTIVE MOVIE

(75) Inventors: Rony Amira, Rishon Lezion (IL); Assaf Harel, Netanya (IL)

(73) Assignee: Google Inc., Mountain View, CA (US)

(*) Notice: Subject to any disclaimer, the term of this patent is extended or adjusted under 35 U.S.C. 154(b) by 449 days.

(21) Appl. No.: 11/915,646

(22) PCT Filed: May 29, 2006

(86) PCT No.: PCT/IL2006/000629
§ 371 (c)(1),
(2), (4) Date: Nov. 27, 2007

(87) PCT Pub. No.: WO2006/129308
PCT Pub. Date: Dec. 7, 2006

(65) Prior Publication Data
US 2009/0019496 A1    Jan. 15, 2009

(30) Foreign Application Priority Data

May 31, 2005 (IL) .......................................... 168903

(51) Int. Cl.
*G06F 3/00* (2006.01)
*G06F 17/00* (2006.01)
*G06F 13/00* (2006.01)
*G06T 1/00* (2006.01)
*H04N 5/445* (2006.01)
*H04N 7/16* (2011.01)

(52) U.S. Cl. ................ 725/61; 725/37; 725/40; 725/41; 725/60; 725/135; 715/700; 715/716; 715/719; 715/720; 715/721; 715/723; 345/418

(58) Field of Classification Search ...................... 725/87
See application file for complete search history.

(56) References Cited

U.S. PATENT DOCUMENTS 5,446,834 A * 8/1995 Deering ........................ 345/427
2002/0144276 A1 * 10/2002 Radford et al. ................. 725/87
(Continued)

FOREIGN PATENT DOCUMENTS
WO    WO2004049263 A    6/2004

OTHER PUBLICATIONS

Kimber D et al.: "FlyAbout: Spatially indexed panoramic video" Proc ACM Int Multimedia Conf Exhib; Proceedings of the ACM Internation Multimedia Conference and Exhibition 2001, No. IV, 2001, pp. 339-347.

(Continued)

*Primary Examiner* — Justin Shepard
(74) *Attorney, Agent, or Firm* — Sterne, Kessler, Goldstein & Fox P.L.L.C.

(57) ABSTRACT

The present invention relates to a system for transferring an interactive walkthrough movie located at a server via a network and displaying the same at a user station, which comprises: (a) a display unit at the user station for displaying movie frames; (b) a control device at the user station for enabling the user to navigate within the movie; (c) a map of the movie describing the links between the individual movie frames and the index of each movie frame, said map also maintains at any given time the present virtual location of the user within the map; and (d) a prediction unit for receiving inputs from said map and from a user control device, and based on said inputs predicting those future frames that may be required for view by the user, and instructing the server to convey said predicted future frames to the user station. The prediction unit may order a first level of resolution frames when the user is in a virtual movement, and a second level of resolution frames when the user is stationary within the interactive movie.

12 Claims, 7 Drawing Sheets

U.S. PATENT DOCUMENTS

| | | | |
|---|---|---|---|
| 2003/0172131 A1* | 9/2003 | Ao | 709/219 |
| 2004/0239699 A1* | 12/2004 | Uyttendaele et al. | 345/716 |
| 2005/0024362 A1* | 2/2005 | Klein | 345/473 |
| 2005/0117055 A1* | 6/2005 | Kerofsky | 348/438.1 |
| 2005/0125150 A1* | 6/2005 | Wang et al. | 701/213 |

OTHER PUBLICATIONS

Yura S et al: "Real-time browser for the Digital Museum available with low-cost terminals and low-bandwidth networks," TRON Project Internaitonal Symposium, 1996, TEPS '96 Tokyo, Japan Dec. 4-7, 1996, Los Alamitos, CA USA, IEEE Comput. Soc., US, pp. 70-80.

Popescu G V et al: IEEE Computer Society: "An architecture for QoS data replication in network virtual environments" Proceedings IEEE 2002 Virtual Reality (VR). Orlando, FL, Mar. 24-28, 2002, Proceedings IEEE Virtual Reality. (VR), Los Alamitos, CA: IEEE Comp. Soc, US, pp. 41-48.

Aliaga D G et al Institute of Electrical and Electronics Engineers: Sea of Images VIS 2002. IEEE Visualization 2002. Proceedings. Boston, MA, Oct. 27-Nov. 1, 2002, Annual IEEE Conference on Visualization, New York, NY: IEEE, US, 331-338.

Uyttendaele M et al: "Image-based interactive exploration of real-world environments" IEEE Computer Graphics and Applications, IEEE Service Center, New York, NY, US, vol. 24, No. 3, May 2004, pp. 52-63.

* cited by examiner

SYSTEM FOR DISPLAYING VIA A NETWORK OF AN INTERACTIVE MOVIE

FIELD OF THE INVENTION

The field of the invention relates to systems and methods for displaying movies via the Internet. More particularly, the invention relates to a system and method for displaying an interactive movie via a network, such as the Internet, or in a most preferable case, to a system and method for displaying via the Internet an interactive movie enabling a user to virtually travel within a physical site, such as a building, office, etc.

BACKGROUND OF THE INVENTION

Virtual movies are widely used for a variety of purposes, such as exhibitions, remote guidance and touring of places, education, training, electronic games, etc. Some of such movies are animated, and some others are real, in the sense of involving real frames that are photographed within a real, physical site and some combine a mixture of real and animated frames. (It should be noted herein that throughout this application the term "frame" is used to indicate a unitary view that is introduced to the user at a specific time unit. In this respect, it should be noted that there is no distinction as to how this frame is produced, whether by acquiring it fully from the multimedia content, or producing it from a previous frame by completing only the differences from that previous frame in a manner as some compression tools operate). The present invention relates to all such cases, but mostly to the latter case; i.e., to the case where the preparation of a virtual and interactive movie enables a user to interactively explore a real site; i.e., to a case in which a user wishes to watch a movie of a site, and navigate interactively within the site.

In recent years there have been extensive efforts to streamline the playing of multimedia over computer networks with no need of a full movie preload prior to a continuous playback. Throughout this application, a discussion is made to video movies (or clips), although some aspects of the invention may be relevant to other types of multimedia. Most existing solutions take into account the fact that the network bandwidth is limited, and that the speed of transfer dynamically varies. Some solutions suggest the reduction of the amount of data transferred (e.g., by means of compromising the media quality, or by means of compressing the data), and adjustment of the amount of data transferred to the network speed. The main objective is to obtain a smooth experience with maximum image quality for a given bandwidth. One common solution suggests the performing of a preload of a multimedia sequence (such as a movie clip), to balance the stream of the information loading during playback, in order to improve the availability of the clip portions at the user's station, and to prevent delays and suspensions. Throughout this application, the term "station" relates to any type of computer, processor, terminal, workstation, PDA, cellular phone, etc. which has a player for playing a content. Other factors that may affect the proper manner of handling multimedia information at the client side are the size of the data file and the amount of free storage at the user's end. Because the multimedia file at the remote (server) side is usually large, the fact that it cannot always be fully stored or fully preloaded to the client side must be taken into account. In such a case, the user's experience may be hindered due to the need for a relatively long wait for the data he wishes to play.

The above prior art solutions are relatively satisfactory when playing a continuous conventional multimedia clip. However, such solutions cannot meet the stringent requirements of playing an interactive movie via a network of limited bandwidth. In a conventional movie the sequence of the movie frames is well defined, and therefore the maintaining of a FIFO type register at the user station can assist in the availability and integrity of the currently played sequence. However, this is not the case when playing an interactive virtual movie in which, during many stages of the movie, the user is given several options from which to select and continue with different sequences of the movie. This requirement to provide several video sequences to the user at any given time introduces a burden to the effective playing of an interactive virtual movie via the Internet (or any other bandwidth limited) network.

WO 2004/049263 by same inventors discloses a method and system for the preparation of an interactive movie, which simulates the walking of a user within a real site and which enables a user to explore the site. Such a virtual movie can be streamed and displayed to a user relatively smooth, in a high resolution and fast manner. However, any attempt to transfer and simultaneously display this interactive movie via a network, such as the Internet, at a station remote from the location in which the movie is stored, faces difficulties, particularly in satisfying the interactivity and smoothness requirements.

It is an object of the present invention to provide a method and system for the playing of a virtual movie via a bandwidth limited (sometimes very low bandwidth) network, such as the Internet.

It is another object of the invention to enable playing of such a movie in a manner that minimally affects the quality that the user experiences.

It is a particular object of the invention to enable the viewing via the Internet (or any other network) of a virtual movie for exploring a site.

Other objects and advantages of the invention will become apparent as the description proceeds.

SUMMARY OF THE INVENTION

The present invention relates to a system for transferring an interactive movie located at a server via a network and displaying the same at a user station, which comprises: (a) a display unit at the user station for displaying movie frames; (b) a control device at the user station for enabling the user to navigate within the movie; (c) a map of the movie describing the links between the individual movie frames and the index of each movie frame, said map also maintains at any given time the present virtual location of the user within the map; and (d) a prediction unit for receiving inputs from said map and from a user control device, and based on said inputs predicting those future frames that may be required for view by the user, and instructing the server to convey said predicted future frames to the user station.

Preferably, the system of the invention further comprises a cache unit at the user station for temporarily storing movie frames.

Preferably, the prediction unit orders a first level of resolution frames when the user is in a virtual movement within the interactive movie, and a second level of resolution frames when the user is stationary within the virtual movie. Throughout this application the term "resolution" of a frame is used in its broader interpretation to provide indication either the number of pixels in a frame or to the quality of the frame, wherein the "quality" indicates the amount of data or rate of distortion of the frame (for example due to compression-decompression).

Preferably, the said first level is lower than the said second level.

Preferably, the frames are stored in the server in at least two resolution levels.

Preferably, the frames are stored in the server in at least one resolution level, and the server comprises transform means for converting the frames resolution level to at least one other resolution level.

Preferably, the prediction unit instructs the server to convey a third level of resolution frames upon a special request by the user.

Preferably, said third level of resolution is the highest resolution level.

In one embodiment, the prediction unit is positioned at the user station.

In another embodiment, the prediction unit is positioned at the server.

In one embodiment, the map is positioned at the server.

In another embodiment, the map is positioned at the user station.

In still another embodiment, both the prediction unit and the map are positioned at the server.

In still another embodiment, both the prediction unit and map are positioned at the user station.

Preferably, the system further comprises a coordinator at the user station for communicating with said cache and coordinating the displaying of frames on the user display.

In an embodiment of the invention, the prediction unit and map are positioned at the server. Preferably, the system further comprises a coordinator at the user station for communicating with said cache and coordinating the display of frames on the user display.

In an embodiment of the invention, each frame is conveyed from the server to the user station associated with one or more of next frame indices, and wherein said coordinator at the user station determines from said next frame indices the order of the frames to be displayed.

Preferably, said coordinator at the user station determines said order of frames from said one or more next frame indices and from inputs it receives from said user control device.

Preferably, the system further comprises a transfer coordinator at the server for coordinating the flow of frames from the server to the user station.

The present invention further relates to a method for transferring a movie from a remote server via a network and displaying the movie at a user station, which comprises: (a) transferring and displaying to the user lower resolution frames as long as the user is in movement within the movie; and (b) transferring and displaying to the user medium or higher resolution frames as long as the user is stationary within the movie.

Preferably, the method further comprises the steps of: (a) providing a map of the movie; (b) continuously updating the map with the present location of the user within the movie; and (c) looking at the map and, from the present location of the user, predicting those optional near future frames that may be required for display to the user, and ordering said future frames from the server.

DETAILED DESCRIPTION OF PREFERRED EMBODIMENT

Figure 1:
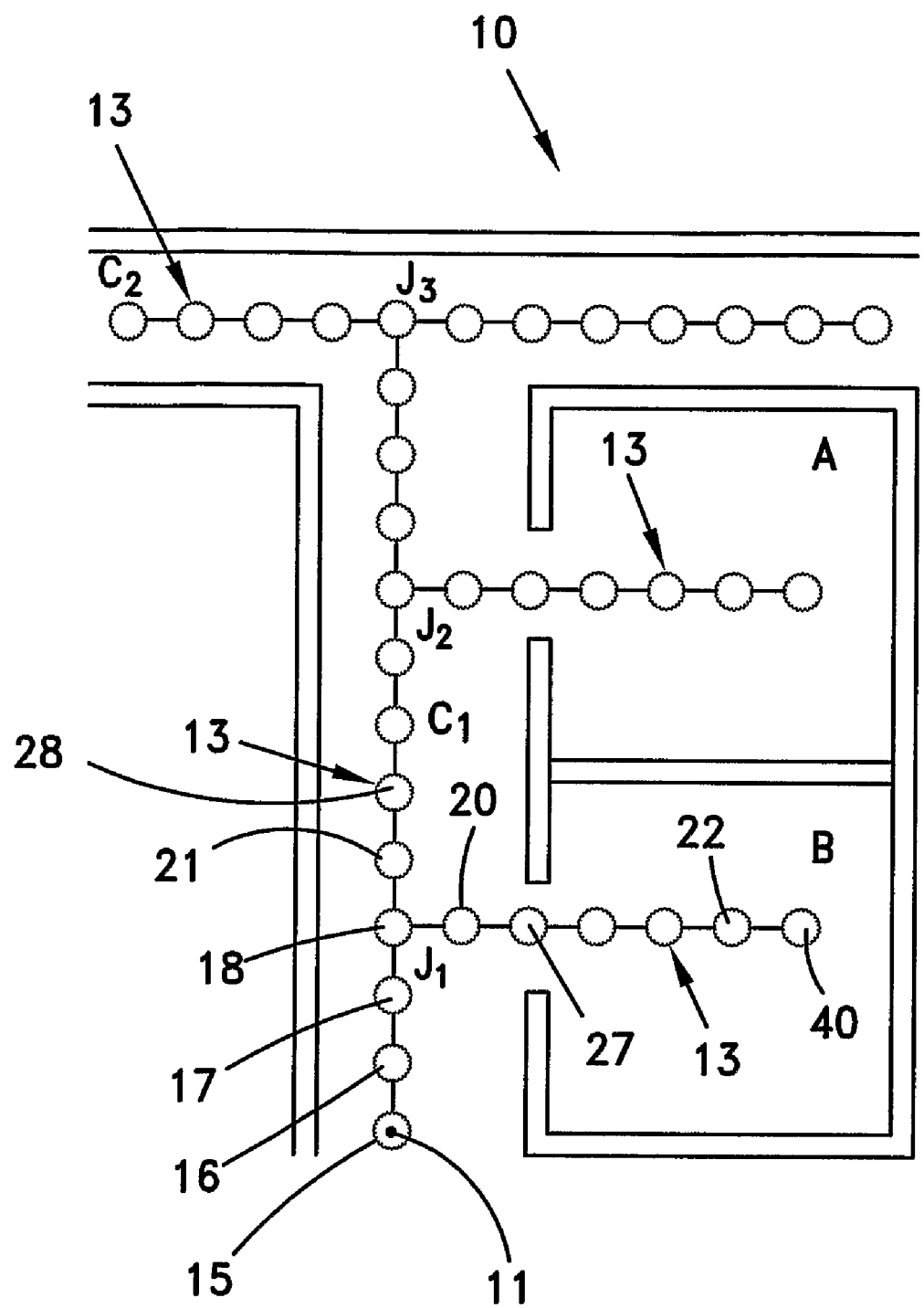
FIG. 1 shows an exemplary scheme of an office, by which a virtual movie is prepared according to the prior art.

A virtual movie is a movie which enables a user to view video (or sequences of frames), in which the user has, in at least some places within the movie, the option of selecting which video segment will be displayed to him. Therefore, in contrast to the case of a regular movie in which the whole sequence and order of the movie is fixed, predefined and known, in a virtual movie the order of the movie segments is left to the user's discretion. Therefore, the transfer of the movie over a network for playing in a user's station (which requires real time availability of the movie frames at the user station) becomes much more complicated, especially when the bandwidth of the network is relatively low. Of course, the higher the resolution of the movie and the larger the content of the whole movie are, the more complicated this real time availability problem of the movie frames at the user station becomes.

As previously said, at any given time at least a portion (generally made from a sequence of frames) of the future movie segments that the user wishes to view has to be available at his station. However, in view of the interactivity, and as there are points in the movie in which the user has several movie segments to select from, at least a portion of each of said optional segments has to be available for display at his station at the time the selection is made, in order to assure smooth and continuous viewing. This interactivity requirement further increases the challenge that the present invention faces.

In any virtual movie, there are times in which the user navigates while being in movement, and there are other times in which he stops, and focuses in a specific view. One aspect of the present invention is the observation that during the "movement" of the user, in which the movie frames are rapidly changed, the resolution can be reduced, as it is assumed that during movement the user does not have a high interest in any specific view included in the rapidly changed sequence of frames. Moreover, during said "movement" periods, the rate of change of the frames enables such reduction of resolution not to severely disturb the user experience. However, when the user "stops" and focuses on a specific view, it is assumed that he has a high interest in said view, and therefore in such "stopping" times a frame with an increased resolution is provided to the user and displayed to him. Furthermore, according to a preferred aspect of the invention, in all such user stopping points the user is given the option of requesting and immediately receiving a highest resolution frame.

Every movie comprises one or more sequences of frames. A conventional movie is essentially one long sequence of frames, while a virtual movie is comprised of several segments, each segment comprising a sequence of frames. The virtual movie also includes at least several junction locations in which a user can select from two or more optional segments to continue. The rate of virtuality of the movie is generally limited, as the user cannot go from each point to all other points in the movie, but he can do so only from some junctions. Therefore, the sequence of frames within a segment is generally fixed, but the transfer from one segment to another is flexible.

The present invention assumes the availability of a digital scheme (also referred to herein as "map") of the movie, indicating all possible routes of the movie, including all those junctions and optional segments given to the user in each junction. Such a scheme contains at least several segments of frames. In each segment, each movie frame is connected to at least one, and generally to more than one next and/or previous frames of the segment. A connection of a frame to a previous frame may be referred to as an "entry" and each connection of a frame to a next frame may be referred to as "exit". An example of such a scheme and a virtual movie is provided in WO 2004/049263.

FIG. 1 shows an exemplary scheme of an office, by which a virtual movie is prepared according to WO 2004/049263, the full content of which is incorporated herein by reference. It should be noted that the this scheme is provided herein as an example only, as the present invention may operate with various types of schemes, as long they contain at least the linkages between frames, junctions, and several optional segments as described above.

The scheme of FIG. 1 shows an office 10 having two corridors (C1, C2) and two rooms (A, B). WO 2004/049263 shows how to produce a virtual movie enabling a user to navigate; i.e., to "walk" around the office. As seen, while beginning at point 11, the user walks up to junction J1, at which he may either turn right into room B or continue straight ahead. Similarly, when arriving at junction J2, the user may either turn right into room A or go straight ahead along corridor C1. When arriving at junction J3, the user may either turn to the right or to the left within corridor C2. Furthermore, while walking along the corridor, the user generally needs to have a relatively limited field of view. In junctions J1, J2, and J3 the user needs a wider field of view, and in rooms A and B he generally needs a field of view of 360°. For example, in junction J1 the user may select the option of continuing along the corridor and view up to the end of the corridor, or he may select the option of turning into room B and see the view of room B, or he may decide to turn back and return along the corridor C1.

WO 2004/049263 describes one way of producing a virtual movie which can be described in a form of a scheme, which is suitable for carrying out the invention. An office is filmed by means of a scanning apparatus which captures frames in up to a 360° field of view. The scanning apparatus is moved forward along the route, while capturing photographs in a relevant (predefined) field of view, from a plurality of filming spots (nodes).

The plurality of points along the route in which the scanning (filming) is performed is indicated in FIG. 1 as nodes 13. The nodes 13 schematically indicate in each specific node location the manner of scanning at that point, and provide other parameters that are specific to this node.

It should be noted that the interactivity of the movie enables the user in some, generally junction, locations to decide between two optional courses. For example, assume that the user "walks" from node point 15 toward junction J1. When he arrives at junction J1, he can either continue in the corridor C1, or turn right to room B. Therefore, prior to the user arriving at junction J1 (for example, at point 17), the display at the user station should already include both the frames of room B (node 20, 27, . . . ) and the frames of the continuing portion of the corridor C1 (nodes 21, 28, . . . ).

Before the filming stage according to WO 2004/049263, a plan is made regarding the routes along which the filming will be made. Along the planed routes, the nodes are created when the scanning apparatus passes a predefined distance D, which may be, for example, every 5-50 cm, or changes its angular orientation by a predefined angle Δ° (for example 5). For each node, a specific camera unit field of view is created. The term "camera unit field of view" defines the angular for each node, a cumulative field of views that are captured by the individual camera forming the camera unit. Then, the scanning apparatus progresses along the planned routes and captures frames.

WO 2004/049263 therefore assumes that the interactive virtual movie is a collection of image data frames that are captured along routes within the physical site. This is translated to a linked scheme of nodes such as of FIG. 1 in which every node comprises an image data that represents a camera unit field of view. The connection from one node to another (i.e., from a selected user field of view (UFOV) in a first node to another (UFOV) in another node) is maintained smooth. The links between nodes allow movement from one node to another in a smooth manner. At the end of the filming process, the movie is essentially ready for use. Thereafter, when the movie is activated, the user may "move" from a first node, viewing a selected view sector, to a second node viewing another view sector, however in closeness enough to maintain smoothness of view. The "moving" of the user from one frame to a next frame is performed by directing the center of the user field of view to an exit direction of the present node, and advancing to the node linked to said present node by said exit. The entry of the user to said next node is made by showing to the user the user field of view (portion of the next node image data) when the center of the user field of view points to the entry direction of said next node.

It should be noted that each segment of the movie has preferably its unique reference number, and all the frames within each segment also receive reference numbers, preferably according to their sequential order within the segment.

As said, the invention of WO 2004/049263 enables a user to virtually navigate in the filmed site, by moving in various directions, and by looking at selected directions. The user is provided with a player, and the movement is made by means of a pointing device, by the arrow of the keyboard, by a joystick, etc. The movie contains a very large amount of data, which does not enable a smooth view by a user via a narrow bandwidth network, such as the Internet. The fact that the movie is interactive, which provides to the user the option of deciding in which direction to look, and furthermore, in junctions such as junction J1 in which direction to move, multiplies by several orders the amount of data that has to be handled in real time. When trying to enable a user to view such a movie via the Internet, this problem becomes much more complicated.

Figure 2A:
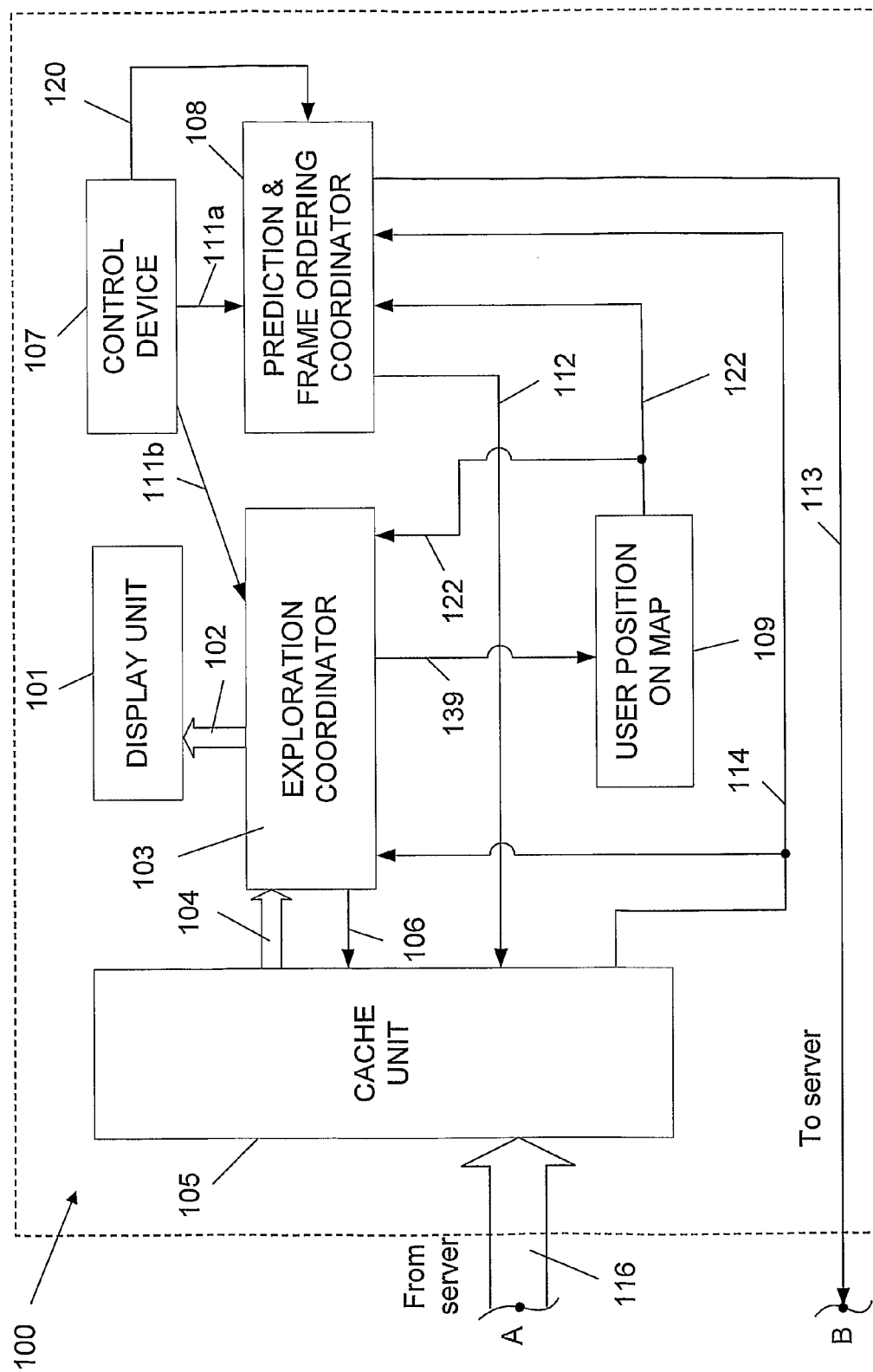
FIG. 2a describes the user side of the system for transferring and playing a virtual movie according to a first embodiment of the invention.
Figure 2B:
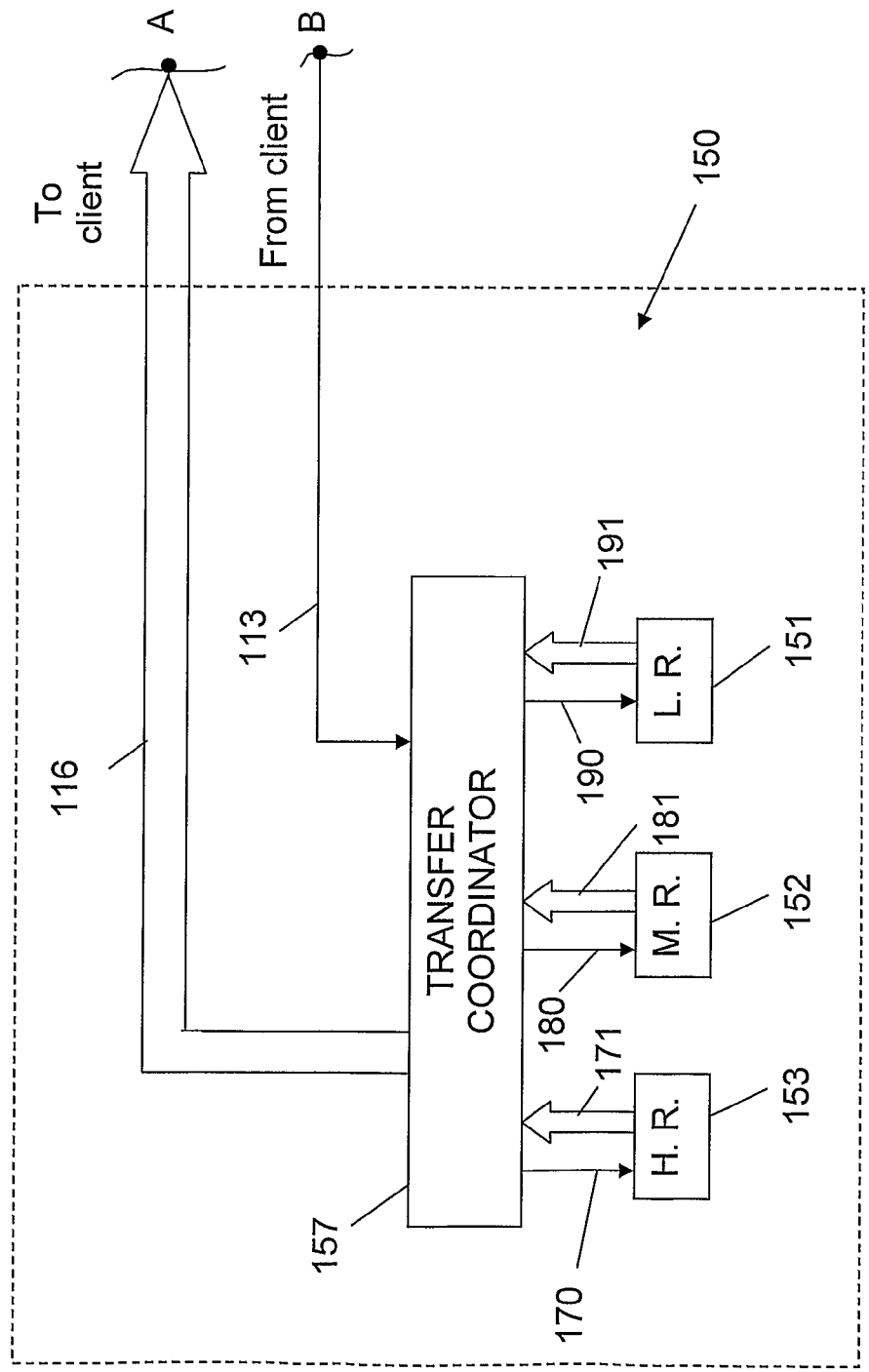
FIG. 2b describes the server side of the system for transferring and playing a virtual movie according to a first embodiment of the invention.

FIGS. 2a and 2b illustrate in schematic general form a system for the transfer via the Internet (or any other network) and play at the user end of a virtual movie. FIG. 2a illustrates the structure of the system 100 at the user end, and FIG. 2b illustrates the structure of the system 150 at the server end. With reference to FIG. 2a, the display unit 101 receives frames via channel 102 and displays them on the user's screen. The display unit displays either video (which is essentially stills frames that are displayed at a high rate) or stills frames. It should be mentioned, that the data via channel 102 may only include updates to a previous frame already displayed, in a manner known in the art. The exploration coordinator 103, among other tasks which will become apparent hereinafter, coordinates the transfer of the frames via channels 104 and 102 from cache unit 105 to the display unit 101. The exploration coordinator 103 orders and verifies the availability of the ordered frames in cache unit 105 by means of line 106. The cache unit 105 is a storage for the frames that are received from the server 150 (FIG. 2b). Due to its limited storage space, it is expected that not all the movie frames will be stored in the cache, and therefore the cache stores only the frames that have been received and are necessary for the display of the movie (i.e., those frames that are most expected to be used). Those frames which have already been displayed (or determined to be unnecessary) may be cleared from the cache and replaced by newly arrived frames. The control device 107 is the device which the user uses for navigation in the movie. As is typical in the art, this may be the mouse of the user, a joystick, the keyboard, etc. The user intention to move to a specific direction (for example to go straight ahead using the corresponding keyboard arrow) is reported over lines 111a and 111b respectively from the control device 107 to both the prediction & frame ordering coordinator (hereinafter "PFOC") 108, and to the exploration coordinator 103. The exploration coordinator 103, which also receives the present location of the user from map 109 over line 122, determines from the said user intention and from his present location on the map the new frame which has to be shown to the user. In this respect, it should be noted that map 109 is digital scheme of the movie, on which the present location of the user in the movie is indicated, and is continuously updated (line 139) according to the user movement. The exploration coordinator 103 checks the availability of the new frame in cache 105. If the said new frame is available, and as will be apparent by the following description, it is most probably available (due to the operation of the PFOC 108); the frame is immediately fetched from the cache, sent to the display unit over channel 102 and displayed to the user. If not, the exploration coordinator 103 waits until this frame becomes available in the cache 105, and only then it fetches the frame and sends it to the display unit 101 over channel 102. Any time when a new frame is sent to the display unit 101, the exploration coordinator updates (line 139) the location of the user on map 109.

The PFOC 108 continuously receives updates 122 relating to the location of the user on the map 109, predicts the next movements of the user, and accordingly orders the necessary frames from the server 150 (it only orders those frames that are not already in the cache), in order to assure their availability at the display unit for maintaining smooth movie playing. It should be noted that, within continuous segments where the user's next movement is clearly defined, all or some of the frames up to the next junction may be ordered; but if there is an approaching junction, the PFOC 108 orders frames relating the routes that follow the junction. The number of frames that are ordered from said routes may vary. If at some stage one of the said several optional routes becomes evident, the frames corresponding to this route are displayed to the user. The frames that have not been used for the longest time may be deleted from the cache and replaced by newly coming frames. The PFOC 108 may operate in such a manner as to optimize the availability of frames at the cache when they are needed. If it is found that ordering a few future frames in each order is enough to ensure smoothness, this is preferable, as in this manner it is expected that fewer frames will be ordered and not finally used. In said latter case, more orders operation from the server 150 will be performed. The ordering by the PFOC 108 generally involves two steps: in the first step the PFOC checks the availability (line 112) of the necessary frames at the cache unit 105, and the second step involves the ordering (line 113) from the server of only the frames that are not available in the cache unit 105. The cache, in turn, reports the availability of frames over line 114 to both the PFOC 108 and to the exploration coordinator 103. The ordered frames from the server are conveyed to the user end 100 over channel 116. As said, the exploration coordinator 103 also receives updates 122 relating to the present location of the user on the map 109, as it needs this information in order to determine at any given moment what the next virtual location of the user in the map will be and the exact frame that has to be fetched from the cache and conveyed to the display unit 101.

Preferably, the operation of the PFOC is enhanced to also continuously check the streaming of the frames from the server to the user station, in order to eliminate the transfer of frames from the server that are found to be no longer necessary at the user station. For example, there may be cases in which a sequence of future frames has been ordered from the server, but while a portion of said sequence has not been yet transferred it is determined that this portion is no longer required at the user station (such a case may be, for example, due to a prediction by the PFOC that subsequently been found to be non-relevant) the PFOC 108 issues a signal to the server to cancel the transfer of those frames that are found to be no longer necessary.

The system as described, and particularly the use of a prediction unit and map, ensures that the future frames are available at the display unit 101 whenever they are required to ensure smooth play. The use of cache further enhances the system by ensuring that frames that are available at the user end (in cache unit 105) are not reordered, but they are fetched from the cache.

As previously said, still another aspect of the invention involves the use of two or more resolution levels of the frames that are ordered and displayed to the user. FIG. 2b describes the structure of the server end 150 in a block diagram form. The movie is preferably stored at the server in three storages relating each to a different level of resolution, a low resolution storage 151, a medium resolution storage 152, and a high resolution storage 153.

According to a preferred embodiment of the invention, still another object of the PFOC 108 is to determine the movement type of the user. As said, the PFOC 108 receives indications relating to the user movement from the control device 107 over line 111a. Therefore, and for the reasons explained above, when the PFOC 108 determines that the user is in movement, it orders from the server low resolution frames. Whenever the PFOC 108 determines that the user stops and looks intently to a specific view, the PFOC 108 orders a medium resolution frame. However, when the user wishes to closely examine a specific view, he is provided with means, such as a button in the user interface, for ordering such a high resolution frame. This indication is conveyed over line 120 to PFOC 108, which in turn orders the highest resolution frame from the server. It should be noted that whenever a medium resolution frame or a highest resolution frame is ordered, the whole frames transfer is halted (or reduced to low priority); and the channel 116 is solely (or mostly) dedicated to the transfer of said medium or highest resolution frame. It should be noted, however, that this transfer halt of the low resolution frames is very short, as only one frame is transferred. When said ordered medium resolution or high resolution frame arrives in the cache, the regular process of low resolution frames transfer resumes.

The exploration coordinator 103 uses the movement information 111b in order to determine at any moment the frame required by the client. It further checks the availability of this frame in cache 105, and assuming it has already been ordered by the PFOC 108 and exists in cache 105, the exploration coordinator fetches the frame, and conveys this frame over channel 102 to the display unit 101.

With reference to FIG. 2b, the transfer coordinator 157 receives the orders for frames and the desired resolution for each order over line 113. It sends a fetch signal over a respective one line 170, 180, or 190, and receives the fetched frames over a respective channel 171, 181, or 191. The transfer coordinator 157 then coordinates the transfer of the frames that are conveyed via channel 116, and the network to the user end 100.

It should be noted that the three storages for the three levels of resolution have been given herein as an example only. Instead of three separate storages, there may exist only one, high resolution storage, and whenever other resolution level is ordered, the high resolution may be transformed by the transfer coordinator 157 into the desired resolution before the transfer.

As shown, in the first embodiment, the map must be located at the user end. Therefore, in the first embodiment, when a user wishes to view a specific interactive movie, the map of that movie is first transferred to the user side.

Figure 3A:
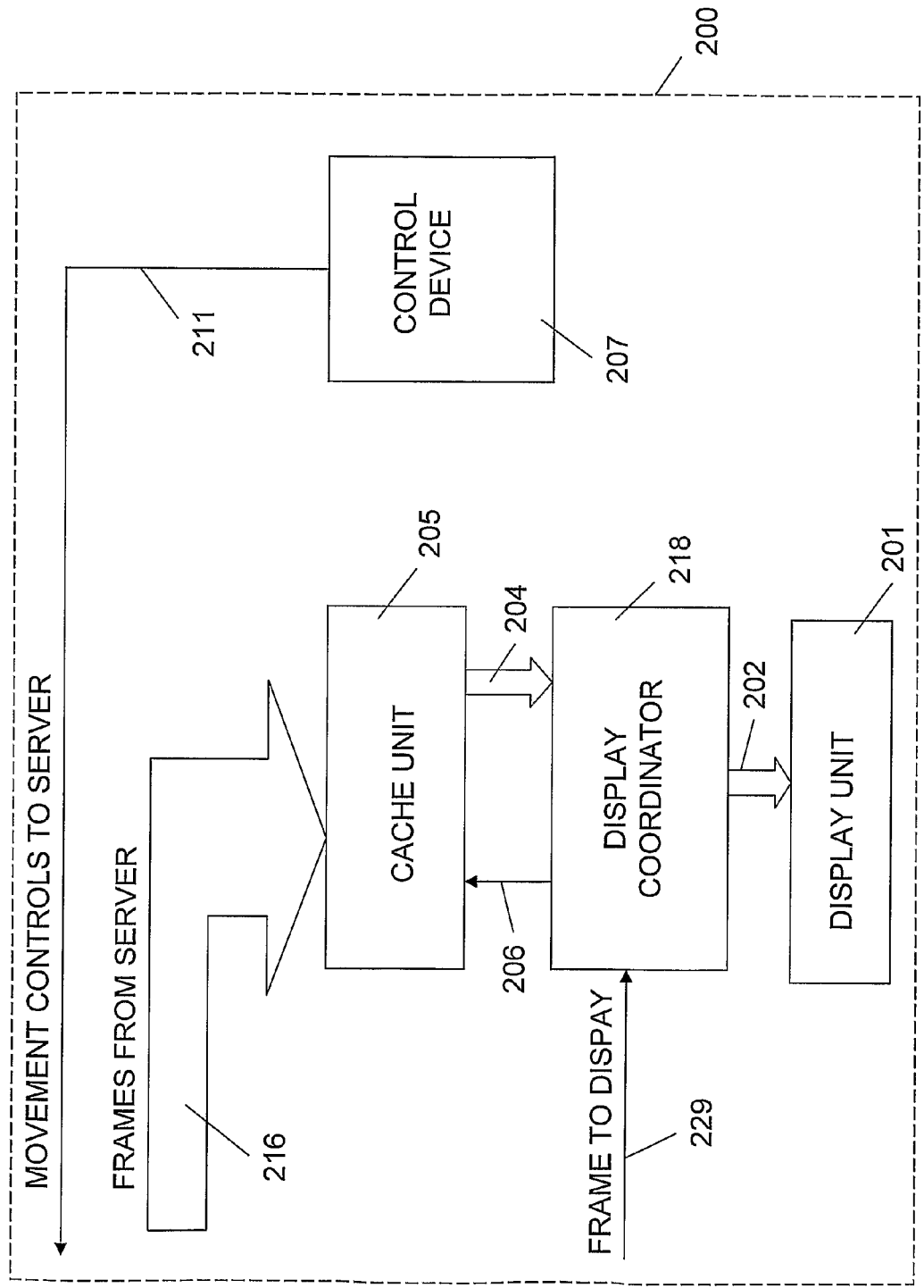
FIG. 3a describes the user side of the system for transferring and playing a virtual movie according to a second embodiment of the invention.
Figure 3B:
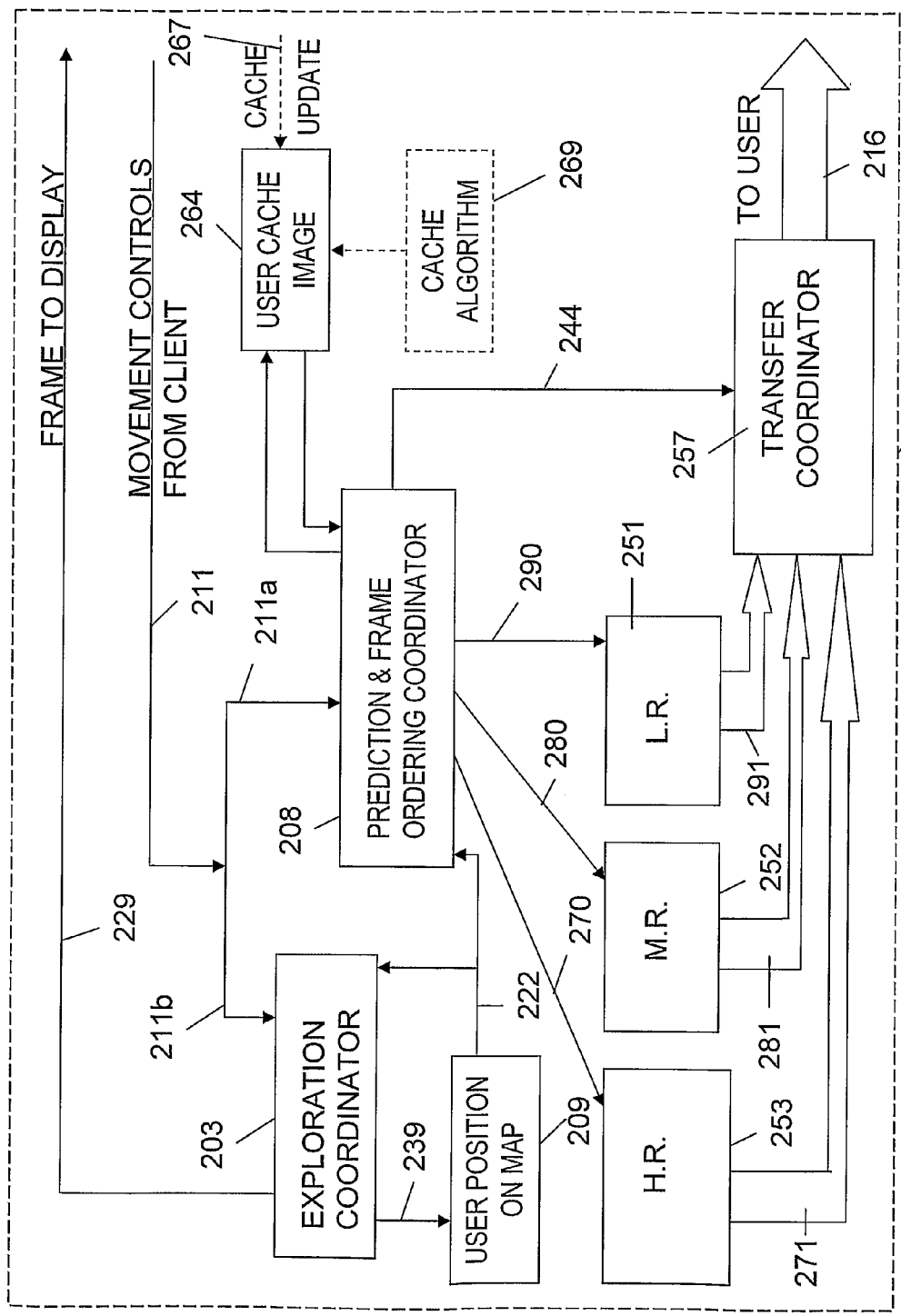
FIG. 3b describes the server side of the system for transferring and playing a virtual movie according to a second embodiment of the invention.

FIGS. 3a and 3b illustrate in schematic general form a second embodiment of the invention. The operation of the second embodiment is similar to the operation of said first embodiment. However, while in the first embodiment most of the units that are responsible for the processing are located at the user side, in the second embodiment most of the said processing units are located at the server side.

FIG. 3a illustrates the structure of the system 200 at the user end, and FIG. 3b illustrates the structure of the system 250 at the server end. With reference to FIG. 3a, the display unit 201 receives frames via channel 202 and displays them on the user's screen. The display unit displays either video (which is essentially stills frames that are displayed at a high rate) or stills frames. It should be mentioned that the data via channel 202 may only include updates to a previous frame already displayed, in a manner known in the art. The display coordinator 218 coordinates the transfer of the frames via channels 204 and 202 from cache unit 205 to the display unit 201. The display coordinator 218 receives on line 229 the indication of the frame that has to be currently displayed, information regarding the current position and the relevant future or current options accordingly. It verifies the availability of this current frame in cache unit 205 by means of line 206. The cache unit 205 acts as storage for the frames that are received from the server 250 (FIG. 3b). Due to its limited storage space, it is expected that not all the movie frames will be stored in the cache. The cache stores only the frames that have been received and are necessary for the display of the movie (i.e., those frames that are most expected to be used). Those frames which have already been displayed (or determined to be unnecessary) may be cleared from the cache and replaced by newly arrived frames. The control device 207 is the device which the user uses for navigation in the movie. As is typical in the art, this may be the mouse of the user, a joystick, the keyboard, etc. The user's intention to move to a specific direction (for example to go straight ahead using the corresponding keyboard arrow) is reported from the control device 207 over line 211 to server 250. In server 250 (FIG. 3b), the user's intention is reported to both the PFOC 208 (line 211a) and to the exploration coordinator 203 (line 211b). The exploration coordinator 203 which also receives the present location of the user from map 209 over line 222 determines, from the said user's intention and from his present location on the map, the new frame which has to be shown to the user. The indication for the new frame (actually the present frame) is conveyed over line 229 to the user side 200 (FIG. 3a). As in the previous embodiment, map 209 is a digital scheme of the movie, on which the present location of the user in the movie is indicated, and is continuously updated (line 239) according to the user movement. At the user end, the indication 229 for the new frame is provided to the display coordinator 218. The display coordinator 218 checks (line 206) for the availability of the new frame in cache 205. If the said new frame is available, and as will be apparent by the following description, it is most probably available (due to the operation of the PFOC 208), the frame is immediately fetched from the cache, sent to the display unit 201 over channel 202, and displayed to the user. If not, the display coordinator 218 waits until this new frame becomes available in cache 205, and only then it fetches the frame and sends it to the display unit 201 over channel 202.

The PFOC 208 continuously receives updates 222 relating to the location of the user on the map 209, predicts the next movements of the user and accordingly orders the necessary frames from one of the three frames storages (low resolution storage 251, medium resolution storage 252, or high resolution storage 253). As will be described hereinafter, in most cases the order will be performed from the low resolution storage 251. This is done in order to assure the availability of the necessary frames at the display unit for maintaining smooth movie playing. It should be noted that, within continuous segments where the user next movement is clearly defined, all or some of the frames up to the next junction may be ordered. However, if there is an approaching junction, the PFOC 208 orders frames relating to the routes that follow the junction. The number of frames that are ordered from said routes may vary. The PFOC 108 may operate in such a manner as to optimize the availability of frames at the cache 205 (at the user side) when they are needed. The cache 205 at the user side may generally operate in such a manner that those frames that have been longest in non-use are replaced by new ones. The ordered frames from the relevant storage are conveyed to the transfer coordinator 257, which in turn transfers them over channel 216 of the network to the user side for display.

As previously said with respect to the embodiment of FIGS. 2a and 2b, there may be cases in which a sequence of future frames has been assigned for transfer from the server to the user station, but while a portion of said sequence has not been yet transferred it is determined that this portion is no longer required at the user station (such a case may be, for example, due to a prediction by the PFOC that subsequently been found to be non-relevant). In similarity to the embodiment of FIGS. 2a and 2b, also in this case the PFOC 208 cancels the transfer of those frames that are found to be no longer necessary at the user station.

The system as described, and particularly the use of a prediction coordinator and map 209, ensures that the future frames are available at the display unit 201 whenever they are required to ensure smooth play. The use of cache further enhances the system by ensuring that frames that are available at the user end (in cache unit 205) are not reordered but are fetched from the cache.

As in the first embodiment, the operation of the second embodiment also involves the use of several resolution levels of the frames that are displayed to the user. As long as the PFOC 208 determines from the signal over line 211a (the movement controls from the control device 207) that the user is in movement, the PFOC 208 orders and causes lower resolution frames (from storage 251) to be sent to the user. Whenever the prediction coordinator 208 determines that the user stops moving, it immediately orders the transfer coordinator to halt the transfer. It then orders a medium resolution frame from storage 252 and sends this medium resolution frame to the user end. If, on the other hand, the PFOC 208 determines that the user wishes to view a high resolution frame, the order is made and conveyed in a similar manner from the high resolution storage 253.

In the embodiment of FIGS. 3a and 3b the cache unit 205 is located at the user station, while the PFOC 208 is located at the server. The PFOC 208, when deciding whether to convey specific frames to the user or not, has to check the content of the cache unit 205, and to send frames only if they are missing from the cache 205. In one embodiment, the PFOC 208 periodically checks and receives updates regarding the availability of specific frames in the cache 205, in order to be able to determine whether specific frames should be sent or not. In another example the server also contains a user cache image 264, which stores current information regarding the content (the frames indexes but not the frames themselves) of cache 205. The user cache image 264 is updated when the content of cache 205 changes, in order to reflect the true and current content of cache 205. In one option, the updates are provided from the user station as shown by line 267. In another example, the server maintains an algorithm 269, which operates exactly according to similar algorithm at the user station which governs the content of cache 205 (i.e., which frames in the cache to delete in order to vacant a space for new frames). In such a manner, and using said algorithm 269, the User Cache Image 264 can always be updated according to the content of cache 205, as same algorithm is performed and govern the content at said two locations.

Figure 3C:
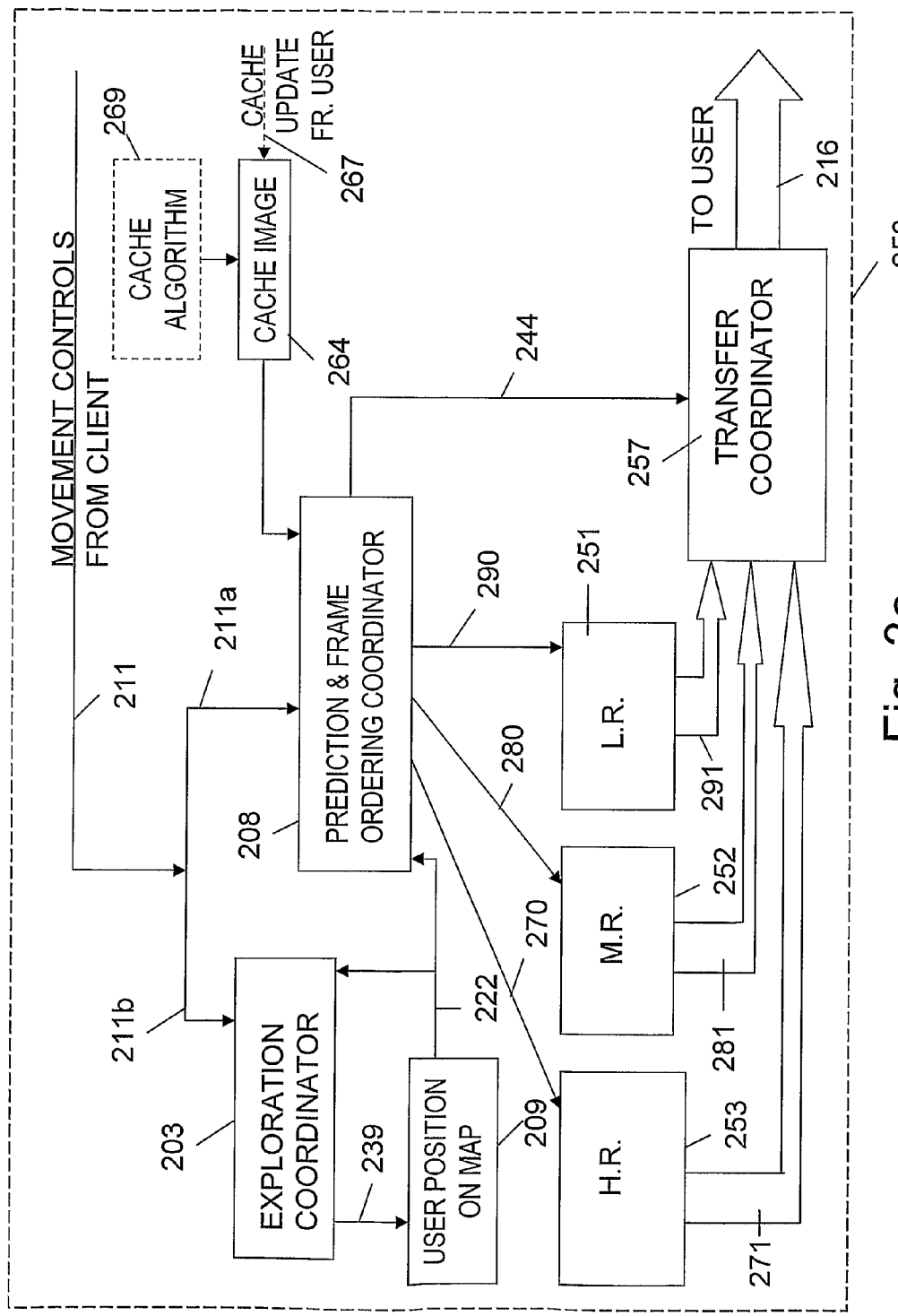
FIG. 3c describes the user side of the system for transferring and playing a virtual movie according to a variation of the second embodiment of the invention.
Figure 3D:
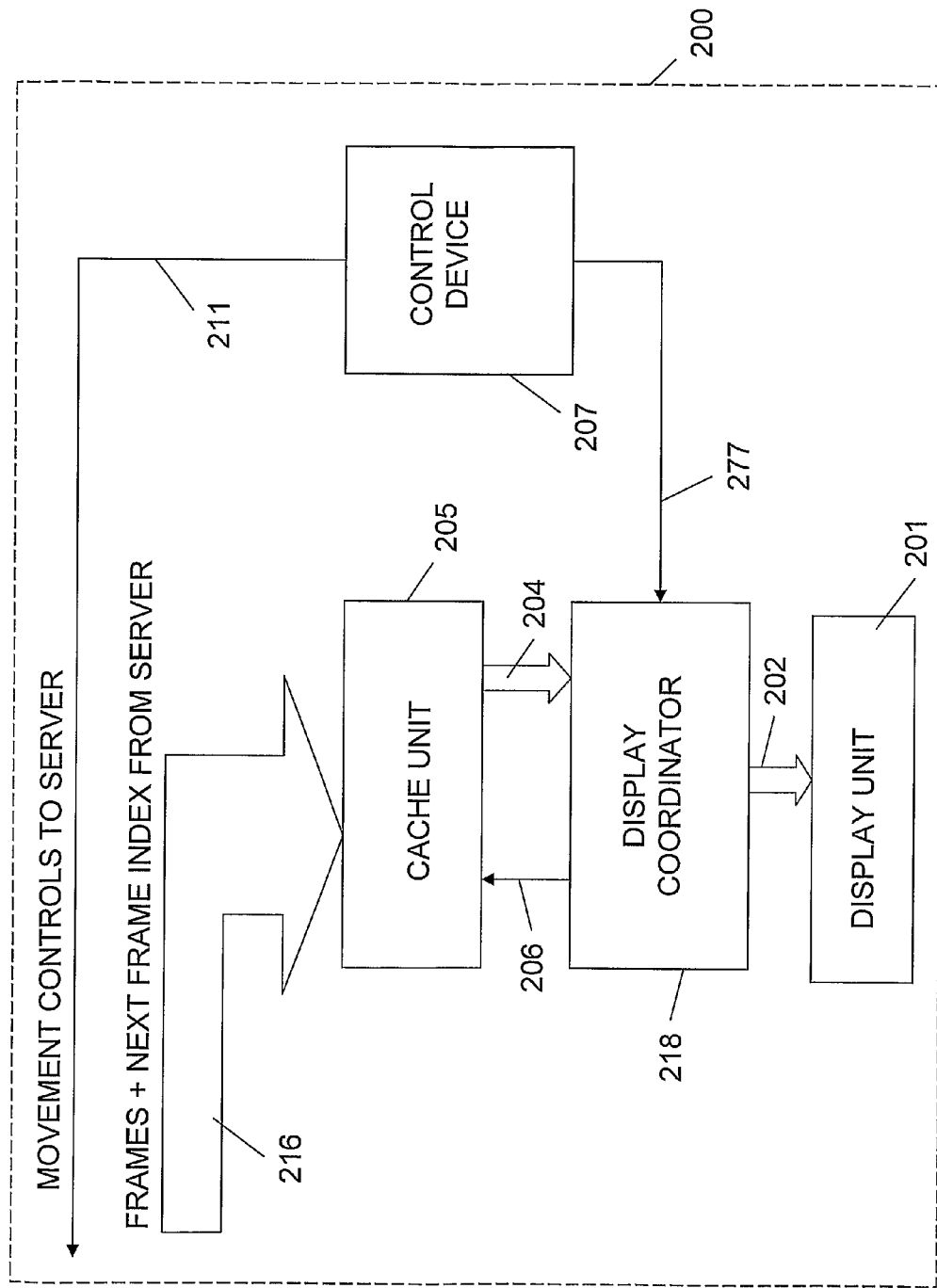
FIG. 3d describes the server side of the system for transferring and playing a virtual movie according to a variation of the second embodiment of the invention.

FIGS. 3c and 3d illustrate in block diagram form still another embodiment of the invention. This embodiment is essentially similar to the embodiment of FIGS. 3a and 3b, with some modifications as follows. In the embodiment of FIGS. 3a and 3b a signal "frame to display 229" is sent from the server to the user station, and this signal determines at any given time which frame is displayed at the user's display. According to the embodiment of FIGS. 3c and 3d this signal is eliminated. Instead, each frame which is sent from the server to the user station over channel 216 is associated with the index of the next neighboring frame (or several indices when the frame is followed by several optional frames). By the term "next", it is meant herein any possible adjacent frame to the current one, i.e., for example, a frame before, after, to the side, etc. The said associated indices of the frames are also saved, enabling the system to determine at any given time when a frame is displayed the next frame to display. In most cases, this task is simple, as in most cases there are only a few possible next frames, and therefore only a few next frame indices are associated with the frame. However, for example in a junction frame, there may be several optional indices that are associated with the frame, and the display coordinator 218 has to determine which of the next optional frames it has to display. This decision can be made by means of providing to the display coordinator 218 a direction input 277 from control device 207. Using this indication, the coordinator 218 can select the right frame to display.

In another aspect of the invention, it has been found that simultaneously with the playing of the movie, it is preferable to display to the user a small version of the site map, on which the present user location is displayed. Therefore, according to a preferred embodiment before playing the movie the site map is initially transferred from the server to the user. Thereafter, each time a frame is transferred from the server to the user station, the x; y location from where the frame was captured and also the view direction are also transferred associated with the frame. This additional data is also stored in the cache at the user station. When the virtual movie is played at the user station, said additional small map is also displayed, and using said additional data, the current user location and his view direction are also displayed over the map.

It should also be noted that the three storages for the three levels of resolution have been given herein as an example only. Instead of three separate storages, there may exist only one, high resolution storage, and whenever other resolution level is ordered, the high resolution may be transformed by the transfer coordinator 157 into the desired resolution before the transfer. Furthermore, while in the first embodiment the map has to be transferred to the user side, according to the second embodiment this transfer of the map to the user side is not required. It should further be noted that the present invention does not preclude preloading of a portion of the movie prior to playing of the interactive movie. As in the prior art, the use of preload may be advantageous, particularly in slow networks.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A computer system for displaying an interactive movie, the interactive movie located at a server and provided via a network, the system comprising:
   an exploration coordinator configured to:
      determine whether the interactive movie is playing, wherein playing of the interactive movie includes rapidly displaying images associated with at least a portion of a plurality of frames that make up the interactive movie;
      determine whether the interactive movie is paused, wherein pausing of the interactive movie includes displaying the image associated with a single frame;
      determine an indicator's location on a map of the interactive movie, the map representing at least a portion of the path, wherein the map describes a sequence for displaying the plurality of frames, and wherein the indicator that shows a location on the map that represents a point along the path where the image associated with a frame currently selected for display was captured; and
      receive user input, wherein the user input includes one or more commands to navigate between frames of the interactive movie;
   a prediction coordinator configured to:
      determine, based on either the location of the indicator on the map or input received from a user, one or more future frames that may be displayed;
      while the interactive movie is playing, requesting lower resolution future frames, wherein a particular lower resolution future frame corresponds to a particular frame of the interactive movie, and wherein the particular lower resolution future frame includes a lower resolution version of the image associated with the particular frame; and
      while the interactive movie is paused, requesting a higher resolution frame, wherein the higher resolution frame corresponds to the frame currently selected for display, and wherein the higher resolution frame includes an image at a higher resolution than the image associated with a corresponding lower resolution frame.

2. The computer system of claim 1, further comprising a cache unit for temporarily storing frames of the interactive movie.

3. The computer system of claim 1, wherein each frame includes one or more next frame indices that each describe a next frame for display, and wherein the prediction coordinator is further configured to determine the one or more future frames based on the next frame indices associated with the frame currently selected for display.

4. The computer system of claim 3, wherein the exploration coordinator is further configured to determine a sequence for displaying the plurality of frames based on the next frame indices associated one or more particular frames.

5. The computer system of claim 1, wherein the prediction coordinator is further configured to request the images associated with one or more frames at a specific resolution level, wherein the specific resolution level is based, at least in part, on user input.

6. The computer system of claim 5, wherein the specific resolution level is the highest resolution level.

7. A computer system for providing an interactive movie to a user device via a network, the system comprising:
   an exploration coordinator configured to:
      determine whether the interactive movie is playing at the user device, wherein playing the interactive movie includes rapidly displaying images associated with at least a portion of a plurality of frames that make up the interactive movie;
      determine whether the interactive movie is paused, wherein pausing the interactive movie includes displaying the image associated with a single frame; and
      provide at least a portion of a map of the interactive movie, the map representing at least a portion of the path, wherein the map describes a sequence for displaying the plurality of frames, and wherein the map includes an indicator that shows a location on the map that represents a point along the path where the image associated with a frame currently selected for display was captured;
      receive user input, wherein the user input includes one or more commands to navigate between frames of the interactive movie;
   a prediction coordinator configured to:
      determine, based on either the location of the indicator on the map or input received from a user, one or more future frames that may be displayed; and
   a transfer coordinator configured to:
      while the interactive movie is playing at the user device, providing lower resolution future frames, wherein a particular lower resolution future frame corresponds to a particular frame of the interactive movie, and wherein the particular lower resolution future frame includes a lower resolution version of the image associated with the particular frame; and
      while the interactive movie is paused at the user device, providing a higher resolution frame, wherein the higher resolution frame corresponds to the frame currently selected for display, and wherein the higher resolution frame includes an image at a higher resolution than the image associated with a corresponding lower resolution frame.

8. The computer system of claim 7, wherein the image associated with each frame is stored in at least two resolution levels.

9. The computer system of claim 7, wherein the image associated with each frame is stored in one resolution level, and wherein the transfer coordinator is further configured to convert the image associated with a frame to a lower resolution level.

10. The computer system of claim 7, wherein each frame includes one or more next frame indices that each describe a next frame for display, and wherein the prediction coordinator is further configured to determine the one or more future frames based on the next frame indices associated with the frame currently selected for display.

11. The computer system of claim 10, wherein the exploration coordinator is further configured to determine a sequence for displaying the plurality of frames based on the next frame indices associated one or more particular frames.

12. The computer system of claim 7, wherein the transfer coordinator is further configured to provide the images associated with one or more frames at a specific resolution level, wherein the specific resolution level is based, at least in part, on user input.

\* \* \* \* \*